(12) United States Patent
Hirabayashi

(10) Patent No.: US 8,371,032 B2
(45) Date of Patent: Feb. 12, 2013

(54) POWER TOOL WITH VIBRATION REDUCING MECHANISM

(75) Inventor: Shinji Hirabayashi, Anjo (JP)

(73) Assignee: Makita Corporation, Anjo-Shi (JP)

(*) Notice: Subject to any disclaimer, the term of this patent is extended or adjusted under 35 U.S.C. 154(b) by 0 days.

(21) Appl. No.: 13/160,410

(22) Filed: Jun. 14, 2011

(65) Prior Publication Data

US 2011/0239474 A1 Oct. 6, 2011

Related U.S. Application Data

(63) Continuation of application No. 10/909,043, filed on Jul. 30, 2004, now Pat. No. 7,996,996.

(30) Foreign Application Priority Data

Aug. 1, 2003 (JP) ................................. 2003-205477

(51) Int. Cl.
- B23D 49/00 (2006.01)
- B23D 49/16 (2006.01)
- B23D 51/00 (2006.01)
- B23D 51/16 (2006.01)

(52) U.S. Cl. ................ 30/392; 30/393; 83/615; 83/632; 74/22 R; 74/50; 74/61

(58) Field of Classification Search ............ 30/392–394; 83/615, 632; 74/44, 50, 49, 22 R, 22 A, 61
See application file for complete search history.

(56) References Cited

U.S. PATENT DOCUMENTS

| | | | |
|---|---|---|---|
| 2,970,484 A | 2/1961 | Springer |
| 3,309,932 A | 3/1967 | Davis |
| 3,827,323 A | 8/1974 | Jacobs |
| 3,945,120 A | 3/1976 | Ritz |
| 4,344,729 A | 8/1982 | Orsinger et al. |
| 4,763,760 A | 8/1988 | Haman et al. |
| 5,079,844 A | 1/1992 | Palm |
| 5,099,705 A | 3/1992 | Dravnieks |
| 5,134,777 A | 8/1992 | Meyer et al. |

(Continued)

FOREIGN PATENT DOCUMENTS

| | | |
|---|---|---|
| CN | 2504022 Y | 8/2002 |
| DE | 39 21 891 | 1/1991 |

(Continued)

OTHER PUBLICATIONS

Office Action dated Jul. 30, 2008 from the JPO in priority JP application No. 2003-205477, including English translation of prior art rejection.

(Continued)

*Primary Examiner* — Laura M. Lee
(74) *Attorney, Agent, or Firm* — J-Tek Law PLLC; Jeffrey D. Tekanic

(57) ABSTRACT

A power tool comprises a crank pin that is eccentrically rotatable by a motor about a rotational axis. A non-rotatable first slider is linearly reciprocated by the crank pin so as to linearly reciprocate a tool. An eccentric pin is disposed substantially diametrically opposite of the crank pin relative to the rotational axis and is eccentrically rotatable by the motor about the rotational axis. A non-rotatable second slider is linearly reciprocated by the eccentric pin in a substantially opposite phase from the first slider so that the second slider acts as a counterweight to the first slider in order to reduce vibrations at least in the direction of linear reciprocation. A rotatable component is rotatably driven by the motor about the rotational axis and has a center of gravity displaced from its rotational axis towards the eccentric pin so as to supplement the vibration reducing function of the counterweight.

16 Claims, 5 Drawing Sheets

U.S. PATENT DOCUMENTS

| | | |
|---|---|---|
| 5,212,887 A | 5/1993 | Farmerie |
| 5,735,165 A | 4/1998 | Schockman et al. |
| 6,352,004 B1 | 3/2002 | Greppmair |
| 6,568,089 B1 | 5/2003 | Popik et al. |
| 6,601,465 B2 | 8/2003 | Greppmair |
| 6,763,897 B2 | 7/2004 | Hanke et al. |
| 7,217,178 B2 | 5/2007 | Oki et al. |
| 7,363,713 B2 | 4/2008 | Hirabayashi et al. |
| 7,526,868 B2 | 5/2009 | Oki et al. |
| 7,743,514 B2 | 6/2010 | Oki et al. |
| 2002/0014129 A1 | 2/2002 | Greppmair |
| 2003/0051352 A1 | 3/2003 | Clark |
| 2004/0117993 A1 | 6/2004 | Armstrong |
| 2004/0187324 A1 | 9/2004 | James |
| 2004/0255474 A1 | 12/2004 | Wang |
| 2004/0255475 A1 | 12/2004 | Hirabayashi et al. |
| 2009/0151486 A1 | 6/2009 | Jonsson |

FOREIGN PATENT DOCUMENTS

| | | |
|---|---|---|
| DE | 41 08 984 | 5/1992 |
| JP | 09-136197 | 5/1997 |
| JP | 2001-009632 | 1/2001 |

OTHER PUBLICATIONS

Excerpts from the examination of counterpart European patent application No. 04018020.0-2302-, including Communication dated Oct. 26, 2004 attaching European Search Report, claims searched and examined by the EPO, Examination Report dated Feb. 15, 2006 including prior art grounds for rejection and response thereto filed by Applicant's European representative, including arguments and claim amendments.

POWER TOOL WITH VIBRATION REDUCING MECHANISM

CROSS-REFERENCE

This application is a continuation of U.S. patent application Ser. No. 10/909,043, filed on Jul. 30, 2004, which claims priority to Japanese patent application no. 2003-205477 filed on Aug. 1, 2003.

BACKGROUND OF THE INVENTION

1. Field of the Invention

The present invention relates to a power tool, such as a reciprocating saw, and e.g., to a technique for reducing vibrations while performing a power tool operation.

2. Description of the Related Art

Japanese Patent Publication No. 2001-9632 discloses a reciprocating saw that includes a motion converting mechanism for causing a slider to linearly reciprocate in response to rotational movement of the motor. A tool bit is mounted on the end of the slider. Further, the motion converting mechanism includes a counter weight. When the slider reciprocates, the counter weight reciprocates in a direction opposite to the reciprocating direction of the slider, i.e. with a 180° phase shift relative to the slider. As a result, vibrations generated by the reciprocating movement of the slider can be reduced as much as possible, so that power tool vibration can be reduced.

By using such a counter weight that reciprocates with a 180° phase shift relative to the reciprocating movement of the slider, the momentum, mainly the inertial force, can be reduced between the slider and the counter weight in the axial direction of the slider. Thus, effective vibration reduction can be realized. However, the weight of the power tool itself is increased by the weight of the counter weight because the counter weight is additionally provided in the motion converting mechanism. Therefore, further improvement is desired in this respect.

SUMMARY OF THE INVENTION

Accordingly, it is an object of the present teachings to provide a useful technique for achieving weight reduction of the counter weight while still effectively reducing vibrations in a reciprocating power tool.

According to one aspect of the present teachings, a representative reciprocating power tool may include a motor, a tool bit, a slider, a motion converting mechanism, a counter weight and a component part of the motion converting mechanism. The tool bit performs a predetermined operation by reciprocating. The slider linearly reciprocates to drive the tool bit. The motion converting mechanism converts a rotating output of the motor into a reciprocating movement of the slider. The counter weight reciprocates in a direction opposite to the reciprocating direction of the slider to reduce vibrations generated by the reciprocating movement of the slider. The component part moves with a component of motion in a direction parallel to the reciprocating movement of the slider. The component part performs a vibration reducing function together with the counter weight. Because the component part can move parallel to the reciprocating slider to cooperate with the counter weight in reducing vibrations generated within the power tool, the weight of the counter weight can be decreased while still maintaining a sufficient vibration reducing capability.

Other objects, features and advantages of the present invention will be readily understood after reading the following detailed description together with the accompanying drawings and the claims.

DETAILED DESCRIPTION OF THE INVENTION

Figure 1:
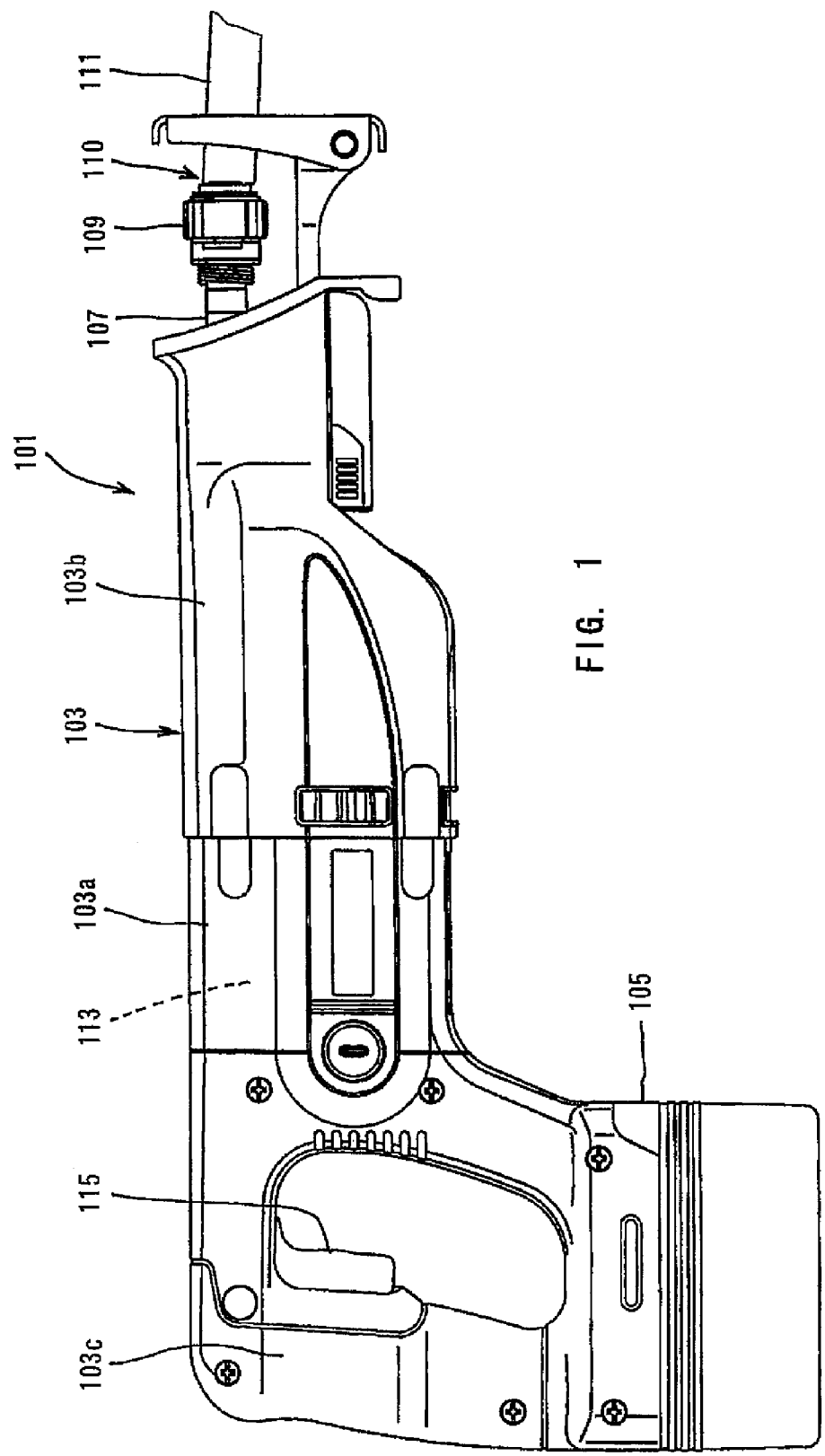
FIG. 1 is a view showing an entire reciprocating saw according to an embodiment of the invention.

In one representative example, a power tool may include a motor, a tool bit, a slider, a motion converting mechanism, a counter weight and a component part of the motion converting mechanism. The power tool according to the invention may include various power tools such as a reciprocating saw and a jig saw to be used to cut various types of workpieces made of, e.g., wood, metal or stone.

In the representative power tool, the tool bit performs a predetermined operation by reciprocating. The slider reciprocates to drive the tool bit. The motion converting mechanism converts a rotating output of the motor into a linear reciprocating movement of the slider.

Further, the counter weight reciprocates in a direction opposite to the reciprocating direction of the slider to reduce vibrations generated by the reciprocating movement of the slider. The expression "reciprocating in a direction opposite to the reciprocating direction of the slider" is intended to include reciprocating in an opposite phase, or more specifically, with a phase shift of 180° or about 180° relative to the slider. However, it also embraces embodiments in which the phase difference between the reciprocating movement of the slider and the reciprocating movement of the counter weight is set such that a time lag is provided between the instant when the slider reaches a top dead center and the instant when the counter weight reaches a bottom dead center. The counter weight may also be referred to as a "balancer".

The component part may move with a component of motion in a direction parallel to the reciprocating movement of the slider. Preferably, the component part may include an already-existing element, such as a rotating element rotated by a motor, or a motion converting element that rotates together in unison or in an interlocked manner with the rotating element and converts the rotating motion into linear motion, thereby causing the slider to reciprocate. In the representative power tool, the component part performs a vibration reducing function together with the counter weight.

In one embodiment, the component part can move parallel to the reciprocating slider to cooperate with the counter weight in reducing vibrations generated within the power tool. Therefore, the weight of the counter weight can be decreased without sacrificing vibration reducing capability, because the already-existing component part of the motion converting mechanism generates a force that can be substituted for the portion of the inertial force of the counter weight lost due to its decreased weight.

Preferably, the component part may be located in the vicinity of the slider and moves with components of reciprocating motion in a direction and phase opposite to the reciprocating direction of the slider. Because the component part of the motion converting mechanism is located closer to the reciprocating slider and tool bit, a rotating moment of the slider and tool bit acting upon the power tool around its center of gravity can be efficiently reduced.

Preferably, the component part, which is designed to cooperate with the counterweight, may be defined by a crank (or crank disk) and a crank pin that couples the crank to the slider. Further, the center of gravity of the crank may be located at a position shifted from the center of rotation of the crank toward the counter weight when the counter weight is disposed in its farthest position from the tool bit. With this construction, when the power tool is driven and the crank rotates, the crank generates a centrifugal force in a direction (phase) opposite to the moving direction of the slider. Therefore, the centrifugal force acts in a manner that assists or supplements the inertial force of the counter weight for offsetting the internal force of the slider. As a result, the combined force of the inertial force of the counter weight and the centrifugal force of the crank can act in a direction (phase) opposite to the inertial force of the slider and the tool bit. Thus, it is possible to ensure an efficient vibration reducing capability.

Each of the additional features and method steps disclosed above and below may be utilized separately or in conjunction with other features and method steps to provide improved reciprocating power tools and method for using such reciprocating power tools and devices utilized therein. Representative examples of the present invention, which examples utilize many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

A representative embodiment of the present invention will now be described with reference to the drawings. As shown in FIG. 1, a reciprocating saw 101 serves as a representative embodiment of the power tool according to the present invention and includes a body 103, a battery pack 105 that is removably attached to the body 103, a slider 107 that projects from the body 103 and a blade 111 that is mounted to a chuck 109 on the end of the slider 107 and cuts a workpiece (not shown). The blade 111 is one example of an element that corresponds to the "tool bit" according to the present disclosure. The body 103 is comprised of a motor housing 103a, a gear housing 103b and a handgrip 103c that are integrally formed.

The motor housing 103a of the body 103 houses a motor 113. The motor 113 is driven when the user depresses a trigger switch 115. The blade 111 then reciprocates together with the slider 107 and the chuck 109 and can cut a workpiece. The slider 107, the chuck 109 and the blade 111 form a movable part 110.

Figure 2:
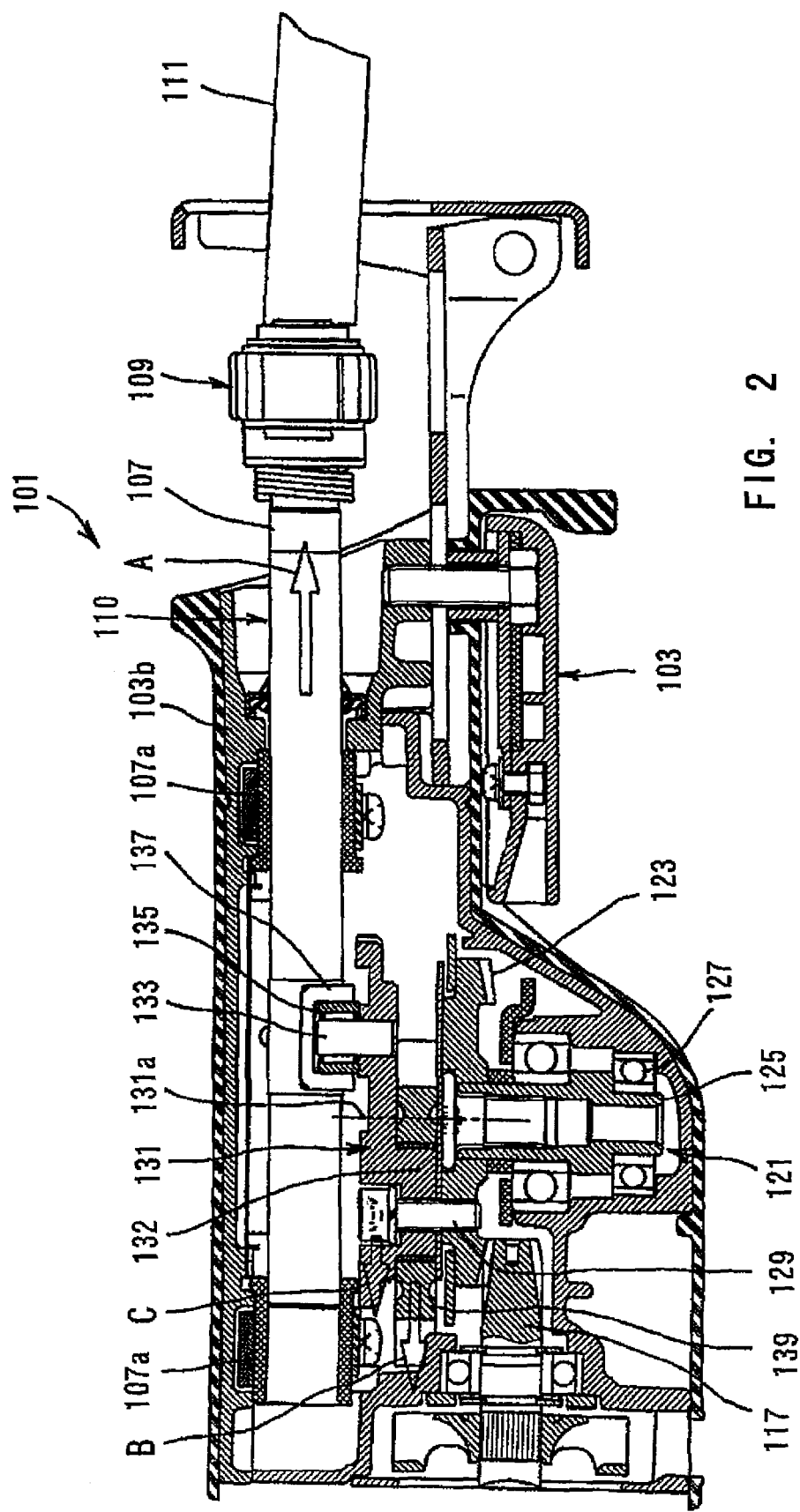
FIG. 2 is a partial, sectional view of the representative reciprocating saw.

FIG. 2 shows a portion of the reciprocating saw 101 according to the present embodiment in a cutaway view. In FIG. 2, the motor housing 103a and the handgrip 103c are not shown. As shown in FIG. 2, bearings 107a support the slider 107 such that the slider 107 can reciprocate in its axial direction. The slider 107 is connected to a motor output shaft 117 via a motion converting mechanism 121 that is disposed within the gear housing 103b of the body 103.

The motion converting mechanism 121 is adapted to convert the rotational motion of the motor output shaft 117 into the reciprocating motion in the axial direction of the slider 107. The motion converting mechanism 121 comprises a bevel gear 123, an eccentric pin 129, a crank disc 131, a crank pin 133 and a counter weight 139. The crank disc 131 is one example of an element that corresponds to the "crank" according to the present disclosure. The crank disc 131 serves as a motion converting element which causes the slider 107 and the counter weight 139 to reciprocate in response to the rotating output of the motor 113. A phase difference of 180° is provided between the reciprocating motion of the slider 107 and the reciprocating motion of the counter weight 139, and the counter weight 139 reciprocates with a phase delay, which will be described below.

The bevel gear 123 is a rotating element which is rotated by the motor 113. The bevel gear 123 is rotatably supported by bearings 127 and is mounted on the upper end of a rotating shaft 125 such that the bevel gear 123 can rotate together with the rotating shaft 125. The bevel gear 123 is engaged with the motor output shaft 117. One end of the eccentric pin 129 is threadably inserted into the bevel gear 123 at a position shifted a predetermined distance from the center of rotation of the bevel gear 123. The eccentric pin 129 has a large-diameter head and a washer on the other end. The crank disc 131 is disposed between the large-diameter head and washer and the bevel gear 123 and is thus integrated with the bevel gear 123 via the eccentric pin 129.

When the bevel gear 123 rotates around the rotating shaft 125, the eccentric pin 129 revolves around the rotating shaft 125, and thus the crank disc 131 rotates in unison together with the revolving eccentric pin 129. Specifically, the crank disc 131 rotates together with the bevel gear 123 in unison, and its center of rotation coincides with the center of the rotating shaft 125. The center of rotation of the crank disc 131 is designated by 131a.

The crank pin 133 is fitted into the crank disc 131 at a position shifted a predetermined distance from the center of rotation 131a. The lower end of the crank pin 133 is press-fit in a pin mounting hole 131b (see FIGS. 5 and 6) that extends through the crank disc 131. The upper end of the crank pin 133 is fitted into a slider block 137 of the slider 107 via a bearing 135. Thus, the crank pin 133 can rotate relative to the slider 107.

Figure 3:
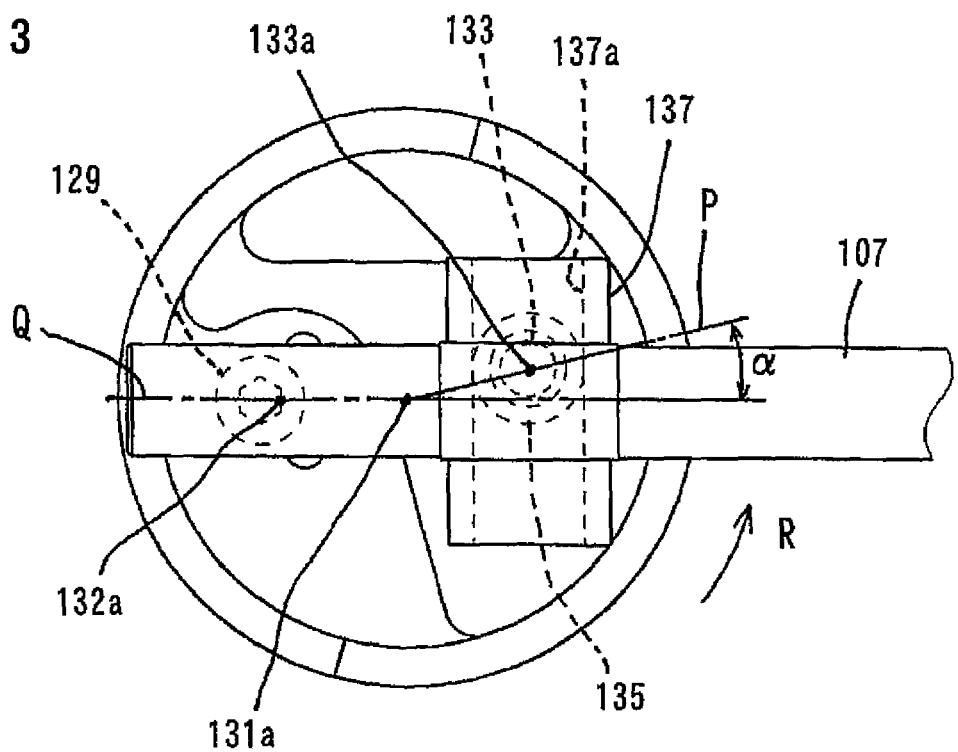
FIG. 3 is a plan view showing a motion converting mechanism and a slider.

As shown in FIGS. 2 and 3, the slider block 137 has a guide groove 137a extending in a direction crossing the longitudinal axis of the slider 107. The crank pin 133 can move relative to the slider block 137 along the guide groove 137a via the bearing 135 that is fitted in the guide groove 137a. As the crank pin 133 revolves around the rotating shaft 125 (see FIG. 2), the components of the revolving motion in the direction crossing the longitudinal axis of the slider 107 within a horizontal plane are permitted in the guide groove 137a; as a result, only the components of the revolving motion in the axial direction of the slider 107 are actually transmitted to the slider 107. The slider 107 is thus allowed to linearly reciprocate only in its axial direction.

Figure 4:
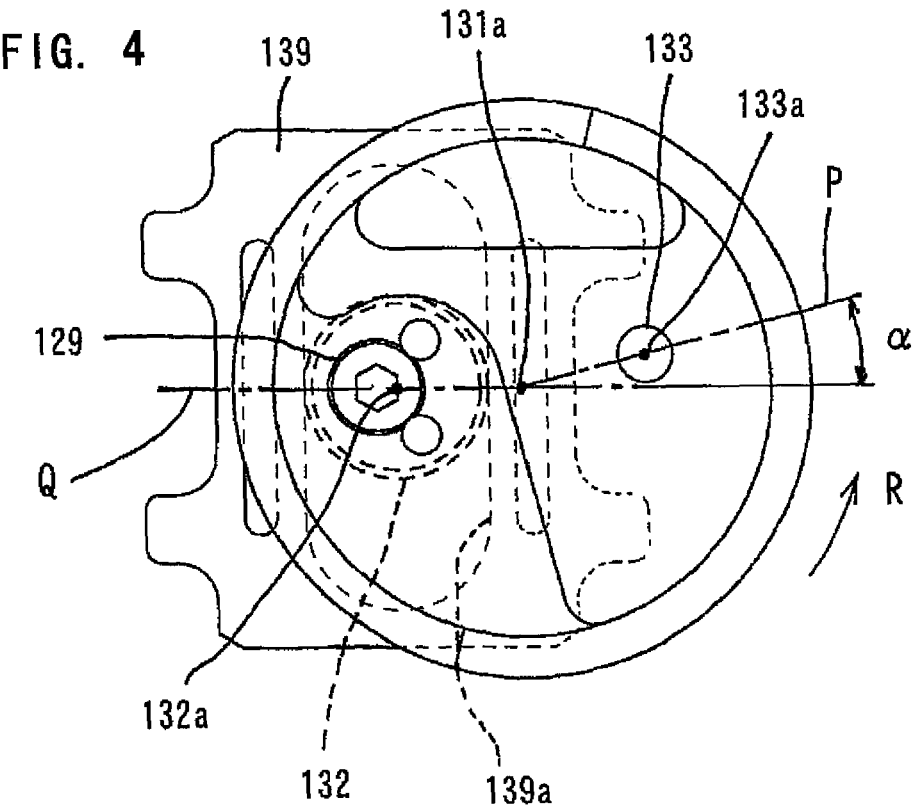
FIG. 4 is a plan view showing the motion converting mechanism and a counter weight.

As shown in FIGS. 2 and 4, the crank disc 131 has a counter weight driving part 132 at a position shifted a predetermined distance from the center of rotation 131a. The counter weight driving part 132 and the crank pin 133 are placed on opposite sides of the center of rotation 131a. The counter weight driving part 132 includes a cam element formed around an eccentric pin mounting hole 131c (see FIGS. 5 and 6), through which the eccentric pin 129 is inserted. The counter weight driving part 132 has a circular contour.

The counter weight 139 is loosely fitted around the counter weight driving part 132. As shown in FIG. 4, the counter weight 139 has an engagement slot 139a extending in a direction crossing the longitudinal axis of the slider 107. The counter weight driving part 132 is disposed in the engagement slot 139a and can move relative to the counter weight 139 in the direction perpendicular to the axial direction. Thus, when the crank disc 131 is rotated and causes the counter weight driving part 132 to revolve around the center of rotation 131a, the components of the revolving motion in the direction crossing the longitudinal axis of the slider 107 within a horizontal plane are permitted in the engagement slot 139a; as a result, only the components of the revolving motion in the axial direction of the slider 107 are actually transmitted to the counter weight 139. Thus, the counter weight 139 is allowed to linearly reciprocate only in the axial direction of the slider 107.

Although it is not particularly shown, the counter weight 139 is slidably supported by a slide guide of a retaining plate that is mounted on the body 103, so that a reliable reciprocating movement of the counter weight 139 is ensured.

As shown in FIGS. 3 and 4, line "P" connecting the center of rotation 131a and the center 133a of the crank pin 133 is inclined by an angle "α" in the direction of rotation of the crank disc 131 relative to line "Q" connecting the center of rotation 131a and the center 132a of the counter weight driving part 132. Therefore, when the crank disc 131 is rotated in the direction of arrow "R" (counterclockwise) around the center of rotation 131a together with the rotating shaft 125 (see FIG. 2), the phase of rotation of the counter weight driving part 132 is delayed relative to the phase of rotation of the crank pin 133 by an amount corresponding to the angle "α".

Figure 5:
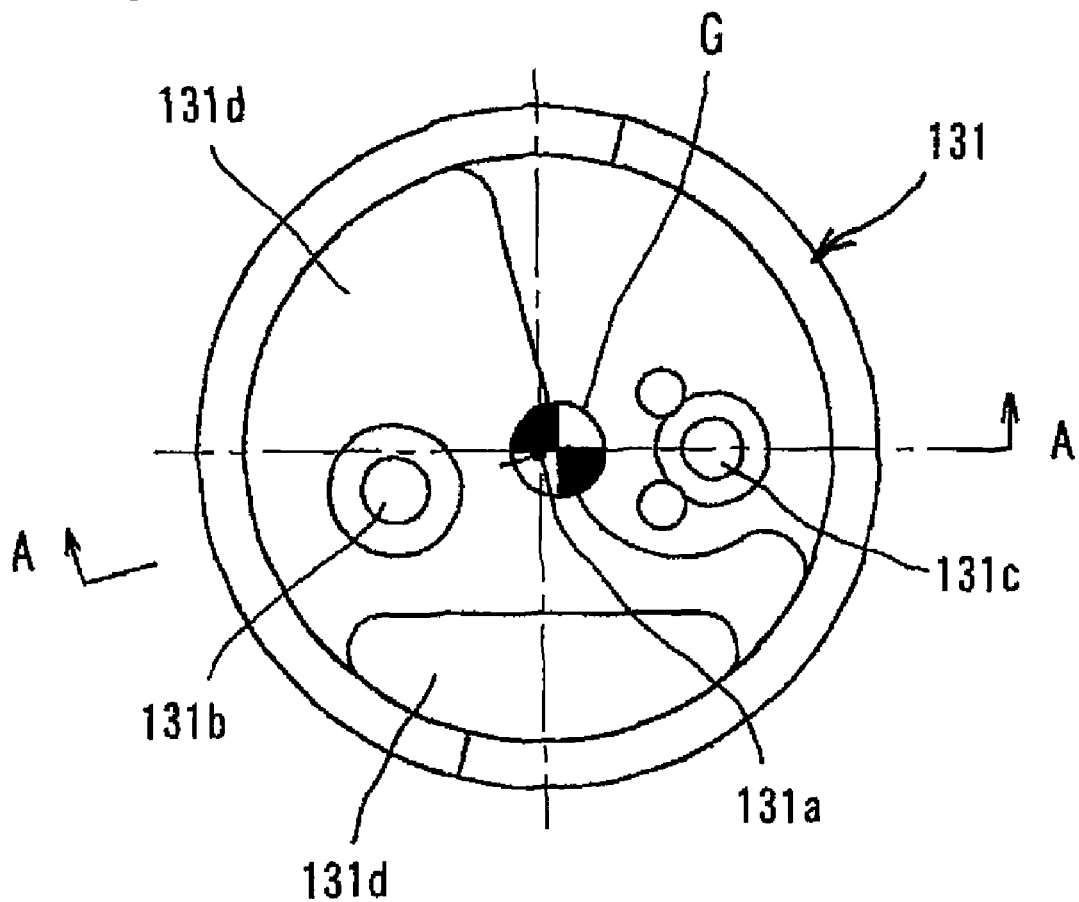
FIG. 5 is a plan view showing a crank disc.
Figure 6:
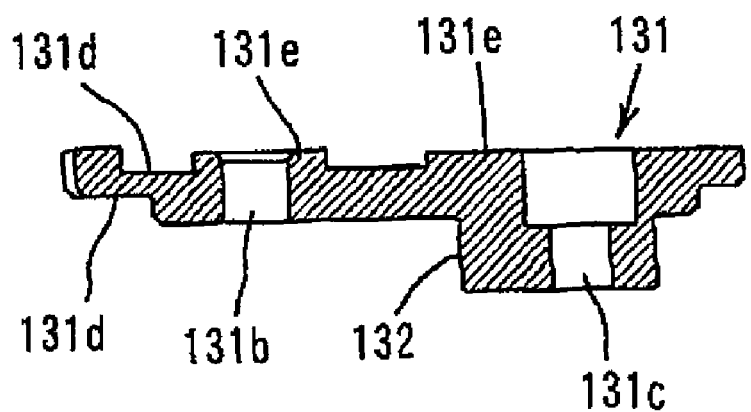
FIG. 6 is a sectional view taken along line A-A in FIG. 5.

FIGS. 5 to 8 show the crank disc 131. In this embodiment, as shown in FIG. 5, the center of gravity "G" of the crank disc 131 is located at a position shifted a predetermined distance from the center of rotation 131a toward the counter weight driving part 132. Specifically, the center of gravity "G" of the crank disc 131 is displaced from the center of rotation 131a in the direction towards the counter weight 139 when the counter weight 139 is disposed in its farthest position from the blade 111. FIG. 5 is a plan view of the crank disc 131, and FIG. 6 is a sectional view taken along line A-A in FIG. 5. The crank disc 131 has a circular contour. The eccentric pin mounting hole 131c for receiving the eccentric pin 129 and the counter weight driving part 132 are formed substantially diametrically opposite to the crank pin mounting hole 131b for receiving the crank pin 131, relative to the center of rotation 131a.

Figure 7:
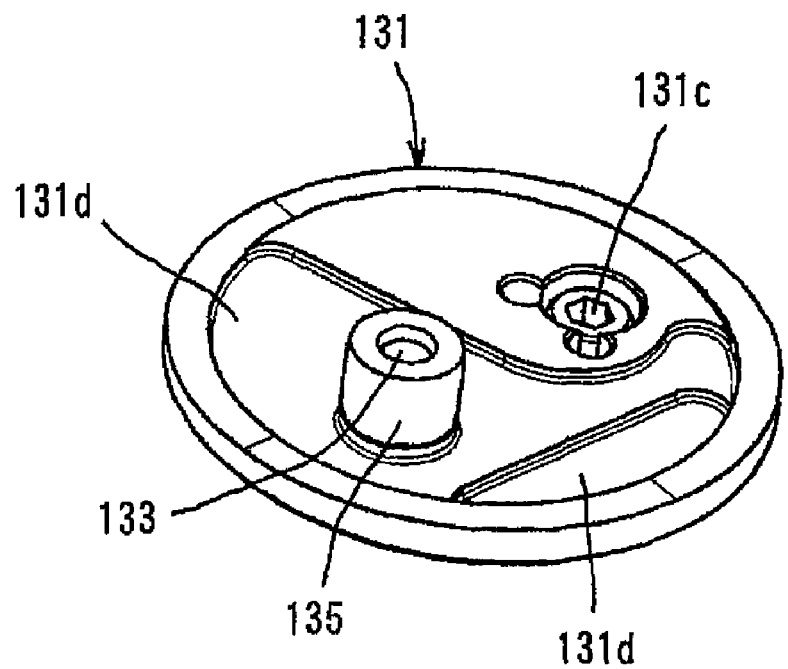
FIG. 7 is a perspective view showing the top side of the crank disc.
Figure 8:
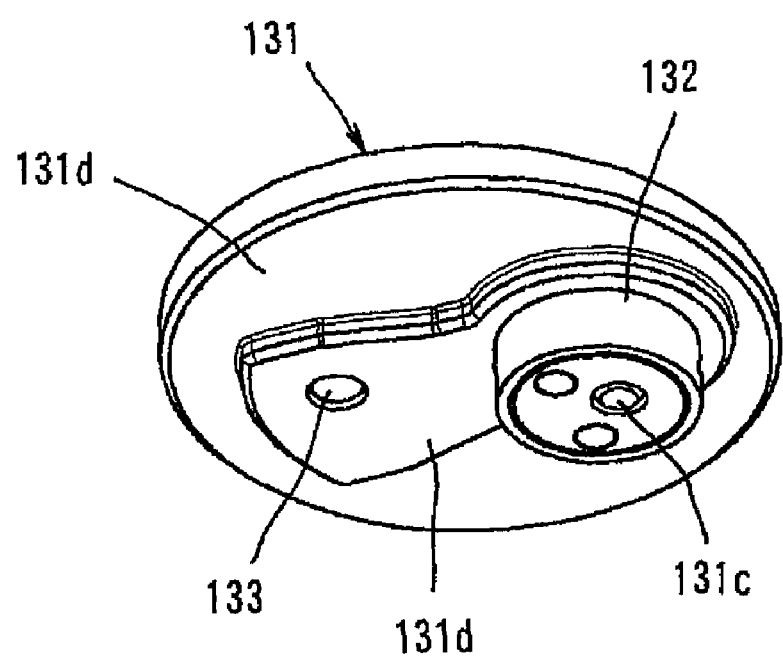
FIG. 8 is a perspective view showing the bottom side of the crank disc.

The position of the center of gravity "G" of the crank disc 131 is determined based upon the state in which the crank pin 133 is fitted in the crank pin mounting hole 131b and the bearing 135 is fitted around the crank pin 133 as shown in FIGS. 7 and 8. In addition, it may be determined by adding the weights of the crank pin 133 and the bearing 135 to the weight of the crank disc 131. The position of the center of gravity "G" is adjusted or displaced with consideration to the strength of hole surrounding portions around the mounting holes 131b, 131c, to which the load is applied. Such adjustment or displacement of the center of gravity can be achieved by varying the thickness of the crank disc 131 stepwise in the circumferential and/or radial direction of the crank disc 131 and/or by forming the hole surrounding portions with an increased wall thickness. Specifically, the crank disc 131 has a circular contour, and one or more stepped portion 131d are formed in the circumferential or radial direction on the upper and/or lower surface of the crank disc 131. Further, a thick wall portion 131e may be formed around each of the crank pin mounting hole 131b and the eccentric pin mounting hole 131c and each may have a larger thickness in the thickness direction of the crank disc than the remaining portion of the crank disc.

The crank disc 131 is shaped as a rotating member. Therefore, in the advantageous construction described above, in which the crank disc 131 has a circular contour and the position of the gravity is determined or set by adjusting or modifying its configuration, the rotational balance of the crank disc can be more readily achieved than, for example, a crank formed in a known rectangular shape.

In this embodiment, as mentioned above, with respect to all of the component parts forming the motion converting mechanism 121, the crank disc 131 is located nearest to the slider 107, and the center of gravity "G" of the crank disc 131 is located at a position shifted (displaced) from the center of rotation 131a toward the counter weight driving part 132. As a result, greater centrifugal force is generated at the position of the center of gravity "G" than the other parts (i.e. the rest) of the crank disc 131 during rotation of the crank disc 131. The crank disc 131 is one example of an element that corresponds to a "component part" of the present disclosure.

Operation and usage of the reciprocating saw 101 constructed as described above will now be explained. When the user depresses the trigger switch 115 of the handgrip 103c, the motor 113 is driven by driving current supplied from the battery 105. Thus, the motor output shaft 117 (shown in FIG. 2) is rotated. When the motor output shaft 117 rotates, the bevel gear 123 that is engaged with the motor output shaft 117 rotates around the rotating shaft 125 in a horizontal plane. This causes the eccentric pin 129, which is eccentrically disposed in a position displaced from the rotating shaft 125, to revolve around the rotating shaft 125. As a result, both the crank disc 131 and the eccentric pin 129 rotate around the center of rotation 131a in a horizontal plane.

As the crank disc 131 rotates, the crank pin 133 also revolves around the center of rotation 131a. The crank pin 133 is loosely fitted in the slider block 137 via the bearing 135. Due to the revolving movement of the crank pin 133, the slider 107 reciprocates between its top dead center and its bottom dead center. Thus, the blade 111 (see FIG. 2) coupled to the chuck 109 on the end of the slider 107 reciprocates in the axial direction of the slider 107 in order to cut a workpiece.

While the slider 107 reciprocates, the counter weight 139 reciprocates between its top dead center and bottom dead center via the counter weight driving part 132 of the crank disc 131, in order to reduce vibrations of the reciprocating saw 101 by reducing the kinetic energy (momentum) generated by the reciprocating movement of the slider 107. When the linearly movable part 110, which includes the slider 107, the chuck 109 and the blade 111, moves, for example, rightward as viewed in FIG. 2, the linearly movable part 110 experiences a rightward inertial force as indicated by arrow "A" in FIG. 2. At this time, the counter weight 139 moves leftward as viewed in FIG. 2 and thus, the counter weight 139 experiences a leftward inertial force as indicated by arrow "B" in FIG. 2.

If the inertial forces "A" and "B" acting in opposite directions have the same magnitude, the forces will be balanced.

As a result, kinetic energy (momentum) generated in the reciprocating direction by the reciprocating movement of the movable part 110 will be reduced by the reciprocating movement of the counter weight 139. Thus, an overall vibration reduction of the reciprocating saw 101 will be efficiently achieved. However, according to this embodiment, the centrifugal force "C" generated by the crank disc 131 assists or supplements the inertial force B experienced by the counter weight 139. Specifically, with the construction in which the center of gravity "G" of the crank disc 131 is located at a position shifted from the center of rotation 131a in the moving direction of the counter weight 139, when the counter weight 139 moves leftward as viewed in FIG. 2, leftward centrifugal force as indicated by arrow "C" in FIG. 2, or components of motion in the moving direction of the counter weight 139, can be provided to the crank disc 131. Thus, the "combined force" of the inertial force "B" of the counter weight 139 and the centrifugal force "C" of the crank disc 131 acts in a direction opposite to the inertial force "A" of the movable part 110. As a result, vibrations generated in the reciprocating direction by the reciprocating movement of the movable part 110 can be reduced.

Thus, in this embodiment, the crank disc 131, which is an already-existing component part included in the motion converting mechanism 121, performs a part of the vibration reducing function of the counter weight 139, or in other words, it functions as a "balancer". The centrifugal force "C" of the crank disc 131 assists or supplements the inertial force "B" of the counter weight 139 in reducing the inertial force "A" of the movable part 110. Therefore, the weight of the counter weight 139, which is a parameter that determines of the inertial force "B" of the counter weight 139, can be reduced by an amount of weight corresponding to the centrifugal force "C" generated by the crank disc 131. As a result, a weight reduction of the reciprocating saw 101 can be achieved while still providing the same vibration reducing capability.

Further, when the slider 107 reciprocates, a rotating moment acts vertically (as viewed in FIG. 2) upon the reciprocating saw 101 around the center of gravity of the reciprocating saw 101. The rotating moment has a magnitude that depends upon the inertial force "A" of the movable part 110. When the movable part 110 moves rightward as viewed in FIG. 2, the rotating moment acts in a manner that may cause the tip end of the reciprocating saw 101 to point downward. On the other hand, when the movable part 110 moves leftward, the rotating moment acts in a manner that may cause the tip end to point upward. In this embodiment, another rotating moment can be generated in a direction opposite to the above-mentioned rotating moment by the centrifugal force "C" generated the crank disc 131, which is the component part nearest to the slider 107. Thus, the rotating moment generated by the centrifugal force "C" can reduce the rotating moment generated by the movable part 110 in cooperation with the rotating moment generated by the inertial force "B" of the counter weight 139. Consequently, the ability to reduce vertical vibrations generated in the reciprocating saw 101 can be improved.

The centrifugal force "C" of the crank disc 131 acts in the lateral direction of the reciprocating saw 101 as well. Therefore, the vibration value in the lateral direction tends to be larger. However, in the reciprocating saw 101 of this embodiment, the above-mentioned reduction of the rotating moment in the vertical direction has a greater influence than the growing imbalance of the lateral force. Accordingly, the three-axis combined vibration value, i.e. the resultant vibration value of the longitudinal, vertical and lateral vibrations, can be reduced.

While cutting a workpiece with the reciprocating saw 101, i.e. under a loaded driving condition for cutting the workpiece, it is necessary to consider not only the effect of the inertial force "A" of the movable part 110 that is generated by the slider 107, the chuck 109 and the blade 111 reciprocating together in unison, but also the effect of the cutting resistance that is generated by friction between the workpiece and the blade 111. This consideration is required because the timing for the vibration reduction by the counter weight 139 may be shifted due to such cutting resistance provided by the workpiece.

Specifically, the inertial force "A" acts in the advancing direction of the movable part 110, while the cutting resistance acts in the direction opposite to this advancing direction. Further, the inertial force "A" is determined by the acceleration of the movable part 110, while the cutting resistance is determined by the speed of the movable part 110. There is a phase difference of 90° between the inertial force "A" and the cutting resistance. Thus, a force (cutting resistance) having a different phase is applied or added, as a function in which the speed is a variable, to the inertial force "A" generated by the movable part 110. Therefore, in order to effectively reduce vibrations in the reciprocating saw 101 under loaded driving conditions, both the inertial force "A" and the cutting resistance provided by the workpiece must be taken into account.

As indicated above, the cutting resistance is determined by the speed of the above-mentioned elements. However, in actual operation, the speed of these elements varies within a certain range according to parameters such as the force, with which the blade 111 is pressed against the workpiece. In order to realize vibration reduction of the reciprocating saw 101 that can fully accommodate such fluctuations of the cutting resistance, the structure or design of the reciprocating saw 101 could otherwise become complicated and, particularly for mass-market models, such may not be practical.

Therefore, in this embodiment, it is intended to provide a design for reducing undesired vibrations as much as possible without complicating the structure of the reciprocating saw 101. To this end, a value of the cutting resistance, which frequently occurs, is chosen or determined in advance. Then, based upon this cutting resistance, the positional relationship between the counter weight driving part 132 and the crank pin 133, including the slider driving part on the crank disc 131, is fixedly set such that a phase delay is caused between the counter weight driving part 132 and the crank pin 133 that corresponds to the predetermined angle "α" as shown in FIGS. 3 and 4. Thus, it is configured such that the phase difference between the reciprocating movement of the slider 107 and the reciprocating movement of the counter weight 139 is fixed. The predetermined angle "α" is determined according to the above-mentioned cutting resistance and it is about 15° in this embodiment.

As a result, as compared to a known technique in which the crank pin 133 and the counter weight driving part 132 are disposed in series (i.e. aligned along line Q shown in FIGS. 3 and 4), the phase of the reciprocating movement of the counter weight 139 is delayed (lags) by an amount corresponding to the angle "α" from the 180° phase shifted state relative to the phase of the reciprocating movement of the slider 107. In other words, the counter weight driving part 132 is fixed in the delayed (lagging) state relative to the crank pin 133 and is rotated, so that the counter weight 139 reaches its bottom dead center with a time delay after the slider 107 reaches its top dead center.

According to this embodiment, the positional relationship between the crank pin 133 and the counter weight driving part 132 is fixedly set, taking into account a certain cutting resistance that is experienced by the blade 111 when cutting the workpiece. As a result, the phase difference between the reciprocating movement of the slider 107 and the reciprocating movement of the counter weight 139 is fixedly set such that a time lag is provided between the instant when one of the members reaches a top dead center and the instant when the other reaches a bottom dead center. Thus, taking into account the cutting resistance that most frequently occurs in actual cutting operations, the phase difference can be fixedly set to an angle that maximizes the effect of the vibration reduction in practical use. Vibration reduction can be realized as effectively as possible without complicating the structure of the reciprocating saw 101.

In this embodiment, the crank disc 131, which is located nearest to the slider 107 of all the component parts forming the motion converting mechanism 121, is adapted to perform a part of the vibration reducing function together with the counter weight 139. However, if the influence of the value of the lateral vibration generated by the centrifugal force C of the crank disc 131 is too small to be significant in cutting operations, it may be constructed such that, instead of the crank disc 131, the bevel gear 123 performs the additional function as a balancer. If necessary, both the crank disc 131 and the bevel gear 123 may have an additional function as a balancer. Further, in this embodiment, the crank disc 131 has a circular shape, but it is not limited to the circular shape.

Further, although the reciprocating saw 101 is described in this embodiment as a representative example of a reciprocating power tool, this invention may be widely applied to any tool, such as a jig saw, which performs an operation on a workpiece while reciprocating.

Further embodiments of the present disclosure include the following:

1. A power tool comprising a motor, a tool bit configured to perform a predetermined operation by reciprocating along its axial direction, a slider configured to reciprocally drive the tool bit in its axial direction, a motion converting mechanism configured to convert a rotating output of the motor into reciprocating movement of the slider, and a non-rotatable counter weight configured to linearly reciprocate in the axial direction of the tool bit or in a direction parallel to the axial direction of the tool bit with a phase that is substantially opposite to the reciprocating movement of the slider so as to reduce vibrations generated by the reciprocating movement of the slider at least in the axial direction of the tool bit, wherein the motion converting mechanism includes a rotatable component part having a center of gravity offset from its rotational axis and disposed such that the center of gravity linearly reciprocates in, or parallel to, the axial direction of the tool bit in unison with the non-rotatable counter weight to thereby perform a vibration reducing function together with the counter weight at least in the axial direction of the tool bit.

2. The power tool as defined in the above-embodiment 1, wherein the component part is located in the vicinity of the slider and is configured to move with components of reciprocating motion in a direction opposite to the reciprocating direction of the slider.

3. The power tool as defined in the above-embodiment 1, wherein the motion converting mechanism comprises a crank disc and a crank pin, wherein the crank disc is coupled to the slider via the crank pin and the crank disc has a center of gravity located at a position offset from its center of rotation toward the counter weight when the counter weight is in its farthest position from the tool bit, and wherein said component part comprises the crank disc.

4. The power tool as defined in the above-embodiment 3, wherein the crank disc has a circular outer circumference, a stepped portion and a thick wall portion, the stepped portion is formed in at least one of the circumferential and radial direction of the crank disc and the thick wall portion is formed around a hole that extends through the crank disc, the thick wall portion having a larger thickness in a depth direction of the crank disc than other portions of the crank disc.

5. The power tool as defined in the above-embodiment 1, wherein the motion converting mechanism comprises a crank disc and a bevel gear configured to rotatably drive the crank disc by utilizing rotational torque provided by the motor, the bevel gear having a center of gravity offset from its center of rotation toward the counter weight as determined when the counter weight is disposed in its farthest position from the tool bit, wherein said component part comprises the bevel gear.

6. The power tool as defined in the above-embodiment 1, wherein the tool bit is defined by a saw blade configured to cut a work-piece by reciprocating.

7. The power tool as defined in the above-embodiment 1, wherein the counter weight includes a slot extending in a direction perpendicular to the axial direction of the tool bit, the slot engaging a portion of the rotatable component part and being configured such that only a component of the rotating motion of the component part in the axial direction of the tool bit is transmitted to the counter weight.

8. A power tool comprising a motor generating a rotational output, means for converting the rotational output into a non-rotating linear reciprocating motion, a tool chuck configured to be linearly reciprocated by the converting means along its axial direction, and a non-rotatable counterweight configured to be linearly reciprocated by the converting means so as to offset vibrations generated at least in the direction of the linear reciprocating motion, wherein the converting means comprises a component that is rotatable about a rotational axis, the rotatable component having a center of gravity of all parts integrally rotating therewith that is offset from the rotational axis in a direction such that, when the center of gravity eccentrically revolves about the rotational axis, an axially-oriented component of the movement of the center of gravity in the direction of the linear reciprocating motion moves in unison with the linearly reciprocating counterweight and such that the combination of the linearly reciprocating counterweight and the axially-oriented component of the center of gravity at least substantially balance axially-acting inertial forces generated by the converting means in a substantially opposite phase.

9. A power tool as in the above-embodiment 8, wherein the center of gravity of the rotating component is set such that inertial forces generated by the linear reciprocating motion, which are perpendicular to the axial direction of the tool chuck, are also at least substantially balanced.

10. A power tool as in the above-embodiment 9, wherein the rotatable component comprises a disk having an at least substantially circular outer circumference and an uneven thickness.

11. A power tool as in the above-embodiment 10, wherein the center of gravity is offset from the rotational axis towards an eccentric pin that engages the rotatable component, the eccentric pin driving the linear reciprocating movement of the non-rotatable counterweight.

REFERENCE NUMERAL LIST 101 reciprocating saw (reciprocating power tool)
103 body
105 battery
107 slider (movable part)

107a bearing
109 chuck (movable part)
110 movable part
111 blade (tool bit, movable part)
113 motor
115 trigger switch
117 motor output shaft
121 motion converting mechanism
123 bevel gear
125 rotating shaft
127 bearing
129 eccentric pin
131 crank disc (crank, one component part)
131a center of rotation
131b crank pin mounting hole
131c eccentric pin mounting hole
132 counter weight driving part
132a center
133 crank pin
133a center
135 bearing
137 slider block
137a guide groove
139 counter weight
139a engagement hole

I claim:

1. A power tool, comprising:
a motor configured to generate a rotational output,
a disk rotatably driven by the motor about a rotational axis,
a crank pin eccentrically rotatable by the motor about the rotational axis,
a non-rotatable first slider configured to be linearly reciprocated by the crank pin, the first slider being configured to linearly reciprocate a tool,
an eccentric pin coupled to the disk and disposed substantially diametrically opposite of the crank pin relative to the rotational axis, the eccentric pin being spaced from the rotational axis so that the eccentric pin does not overlap the rotational axis and being configured to revolve about the rotational axis,
a crank disk having the crank pin press-fit therein, the crank disk being rotatably driven by the motor via the eccentric pin, which is rotatable relative to the crank disk, and
a non-rotatable second slider configured to be linearly reciprocated by the eccentric pin in a substantially opposite phase from the first slider, the second slider acting as a counterweight to the first slider to reduce vibrations at least in the direction of linear reciprocation,
wherein the combination of the disk and eccentric pin have a center of gravity offset from the rotational axis towards the eccentric pin.

2. A power tool according to claim 1, wherein the crank disk has a circular outer circumference.

3. A power tool according to claim 1, wherein the crank disk has an uneven thickness.

4. A power tool according to claim 3, wherein the crank disk includes:
at least one reduced-thickness stepped portion disposed adjacent the crank pin and
at least one increased-thickness portion disposed around the eccentric pin.

5. A power tool according to claim 4, wherein the crank disk has a center of gravity that is offset from a rotational center of the crank disk towards the eccentric pin.

6. A power tool according to claim 5, wherein the disk is a bevel gear having the eccentric pin fixedly mounted thereon.

7. A power tool according to claim 6, wherein the bevel gear has a circular outer circumference.

8. A power tool according to claim 7, wherein the eccentric pin is offset from the crank pin about the rotational axis such that a time lag is provided between the slider reaching its top dead center and the counter weight reaching its bottom dead center.

9. A power tool according to claim 8, wherein the eccentric pin is offset from the crank pin about the rotational axis by about 165°.

10. A power tool according to claim 1, wherein the disk is a bevel gear having the eccentric pin fixedly mounted thereon.

11. A power tool according to claim 10, wherein said bevel gear has a circular outer circumference.

12. A power tool according to claim 1, wherein the eccentric pin is offset from the crank pin about the rotational axis such that a time lag is provided between the slider reaching its top dead center and the counter weight reaching its bottom dead center.

13. A power tool according to claim 1, wherein the eccentric pin is offset from the crank pin about the rotational axis by about 165°.

14. A power tool according to claim 1, wherein the crank disk has a center of gravity that is offset from a rotational center of the crank disk.

15. A power tool according to claim 14, wherein the eccentric pin is rotatably retained in the crank disk and the center of gravity of the crank disk is offset towards the eccentric pin.

16. A power tool according to claim 1, wherein the crank pin is spaced from the rotational axis and is configured to revolve about the rotational axis.

* * * * *